United States Patent
Holmgren

(10) Patent No.: US 7,963,560 B2
(45) Date of Patent: Jun. 21, 2011

(54) PIVOTING DEVICE FOR A CENTRIFUGAL TRACTION ASSEMBLY OF A VEHICLE

(75) Inventor: Lars Holmgren, Vänersborg (SE)

(73) Assignee: VBG AB (Publ), Vanersborg (SE)

( * ) Notice: Subject to any disclaimer, the term of this patent is extended or adjusted under 35 U.S.C. 154(b) by 311 days.

(21) Appl. No.: 12/085,184

(22) PCT Filed: Dec. 13, 2006

(86) PCT No.: PCT/EP2006/012001
§ 371 (c)(1), (2), (4) Date: May 16, 2008

(87) PCT Pub. No.: WO2007/068466
PCT Pub. Date: Jun. 21, 2007

(65) Prior Publication Data
US 2009/0272210 A1   Nov. 5, 2009

(30) Foreign Application Priority Data
Dec. 15, 2005   (EP) ..................................... 05112233

(51) Int. Cl.
*B60B 39/00* (2006.01)
(52) U.S. Cl. ............... 280/757; 180/15; 180/16; 301/42
(58) Field of Classification Search ............. 280/757; 74/89.14, 352; 188/4 B, 4 R; 180/15, 16; 301/42, 43
See application file for complete search history.

(56) References Cited

U.S. PATENT DOCUMENTS

| 2,283,948 | A | * | 5/1942 | Ridgway ................... 188/4 B |
| 2,790,514 | A | * | 4/1957 | Robinson ................... 188/4 R |
| 2,809,704 | A |   | 10/1957 | Greely |
| 5,669,033 | A | * | 9/1997 | Takata et al. ............... 396/612 |
| 6,523,431 | B2 | * | 2/2003 | Ozsoylu et al. ............. 74/443 |
| 7,331,252 | B2 | * | 2/2008 | Pachov ...................... 74/425 |
| 2008/0257672 | A1 | * | 10/2008 | Smith et al. ............. 188/4 R |

FOREIGN PATENT DOCUMENTS
EP   0 255 468   2/1988
EP   0 487 297   5/1992

* cited by examiner

*Primary Examiner* — Paul N Dickson
*Assistant Examiner* — Keith Frisby
(74) *Attorney, Agent, or Firm* — Harness, Dickey & Pierce, P.L.C.

(57) ABSTRACT

The invention discloses an anti-skid mechanism operating device (1) for vehicles comprising an operating unit (2) and an operating arm (3) pivotally supported thereby and intended to carry a rotary anti-skid device (4) and to operate the latter between an active and a passive position. The operating device (2) comprises a worm gear (6) and a driven worm (5) adapted to engage said worm gear (6) for operation of the operating arm (3). The driven worm (5) is resiliently displaceable along an axis (A) of said worm (5).

9 Claims, 3 Drawing Sheets

US 7,963,560 B2

PIVOTING DEVICE FOR A CENTRIFUGAL TRACTION ASSEMBLY OF A VEHICLE

FIELD OF THE INVENTION

The present invention relates to an operating device for a vehicle anti-skid arrangement comprising an operating unit and an operating arm pivotally supported thereby and intended to carry a rotary anti-skid device and to operate the latter between an active and a passive position.

TECHNICAL BACKGROUND

Smaller trucks does usually not have pneumatic or hydraulic systems, hence these systems can not be used to operate an anti-skid device.

Drawbacks with prior art anti-skid devices, which are equipped with damping spring for unintentional movements of the operating arm, are that they are space consuming and will limit the ground clearance of the vehicle. There could also occur impacts or problems causing damage to the device. There is for example devices operated by a wire, which also will act as a spring, having the disadvantages of corrosion and problems during mounting.

SUMMARY OF THE INVENTION

One object of the present invention is to provide an operating device for a vehicle anti-skid arrangement, that in relation to prior art operating devices provides an anti-skid device that is less space consuming.

Another object of the present invention is to provide an operating device which is reliable in operation.

At least one of the above mentioned objects is achieved by an operating device comprising a worm gear and a driven worm adapted to engage said worm gear for operation of the operating arm, wherein the driven worm is resiliently displaceable along an axis of said worm. This provides a compact design. The operating arm is operated between the passive and active position by a driving means for example a motor. The operating arm will, in the active position, engage the rotary anti-skid device with a thrust force against the tire of the vehicle.

Advantageously the driven worm is resiliently displaceable in both directions from a neutral position along said axis. The worm is in the neutral position when it is unloaded both from the driving means and unaffected from externally movements from the operating arm. The fact that the worm is resiliently movable in two directions is advantageous since the mechanism will be free from play and rattle both during operation and when the system is not in use. The worm is resiliently displaceable, which means that the worm has to be affected by a force when it is moved.

Preferably said worm has a limited length causing disengagement of said worm gear due to displacement of said worm by rotation of said worm gear caused by movements from the operating arm. The length of the worm in combination with the resiliently displaceable characteristics can be designed to achieve desired features of the system such as spring stiffness or certain force/distance for disengagement and/or preload of the arm against the tire.

Advantageously the length of said worm admit a preloading of the operating arm without causing disengagement of said worm gear from said worm. The length of the worm in combination with a desired spring stiffness makes it possible to preload the mechanism without causing unintentional disengagement.

According to the inventive concept the worm is axially supported by a resilient means providing the worm to be resiliently displaceable along an axis. It is possible to use different solutions to achieve a resilient worm along an axis.

Preferably said resilient means is arranged around the axis/shaft and formed as a tube of a homogeneous resilient material. This design makes it possible to achieve a compact design and direct driving of the shaft of the worm without interference between the driving and the resilient means.

Preferably said worm and driving shaft are driven by an electrical motor. The motor can be directly connected to the splineshaft for driving of the splined worm engaged with the splineshaft.

If there is an overload applied from the operating arm to the mechanism, the arm and worm gear will resiliently displace said worm providing a temporary disengagement of the motor to avoid damage to the device. This temporary disengagement of the motor is performed by displacement of the worm and the teeth of the worm gear to ratch out of engagement with the worm. This is due to that the worm transmission is self-locking and hence the worm gear will cause the worm to move along the axis instead of rotate the worm and the splineshaft.

There are prior art spring loaded actuating mechanisms, for example INSTA-CHAIN. This design is however space consuming and does not make the arm disengagable from the actuating mechanism, which makes the system sensitive to external impact and displacement.

An advantage according to the concept of the present invention is that the device will manage to react quickly to an external impact due to the resiliently displaceable worm.

BRIEF DESCRIPTION OF DRAWINGS

By way of example, embodiments of the present invention will now be described with reference to the accompanying figures of drawings in which.

DESCRIPTION OF PREFERRED EMBODIMENTS

An operating device 2 according to an embodiment of the invention, will now be described in relation to the figures.

Figure 1A:
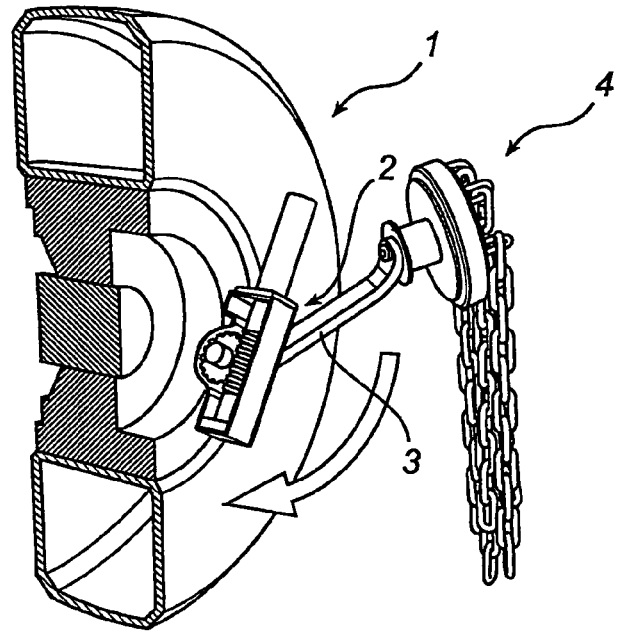
FIG. 1a is a perspective view of an anti-skid arrangement in a passive position.

The anti-skid arrangement 1 illustrated in FIG. 1 is used for engagement with a wheel of a vehicle, to be activated when the ground is slippery, providing an increased friction between the wheel and the ground. It comprises a friction means 4 carried by an operating arm 3 movable by the operating device 2 between an active and passive position. The friction means 4 is constituted of a wheel with a number of chains, but any kind of friction means could be used.

Figure 1B:
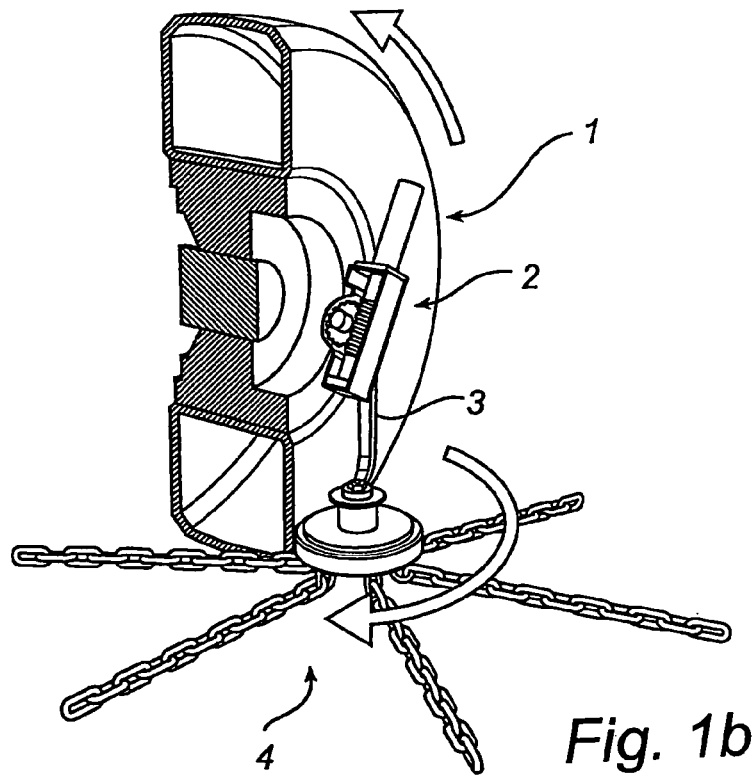
FIG. 1b is a perspective view of an anti-skid arrangement in an activated position.
Figure 2:
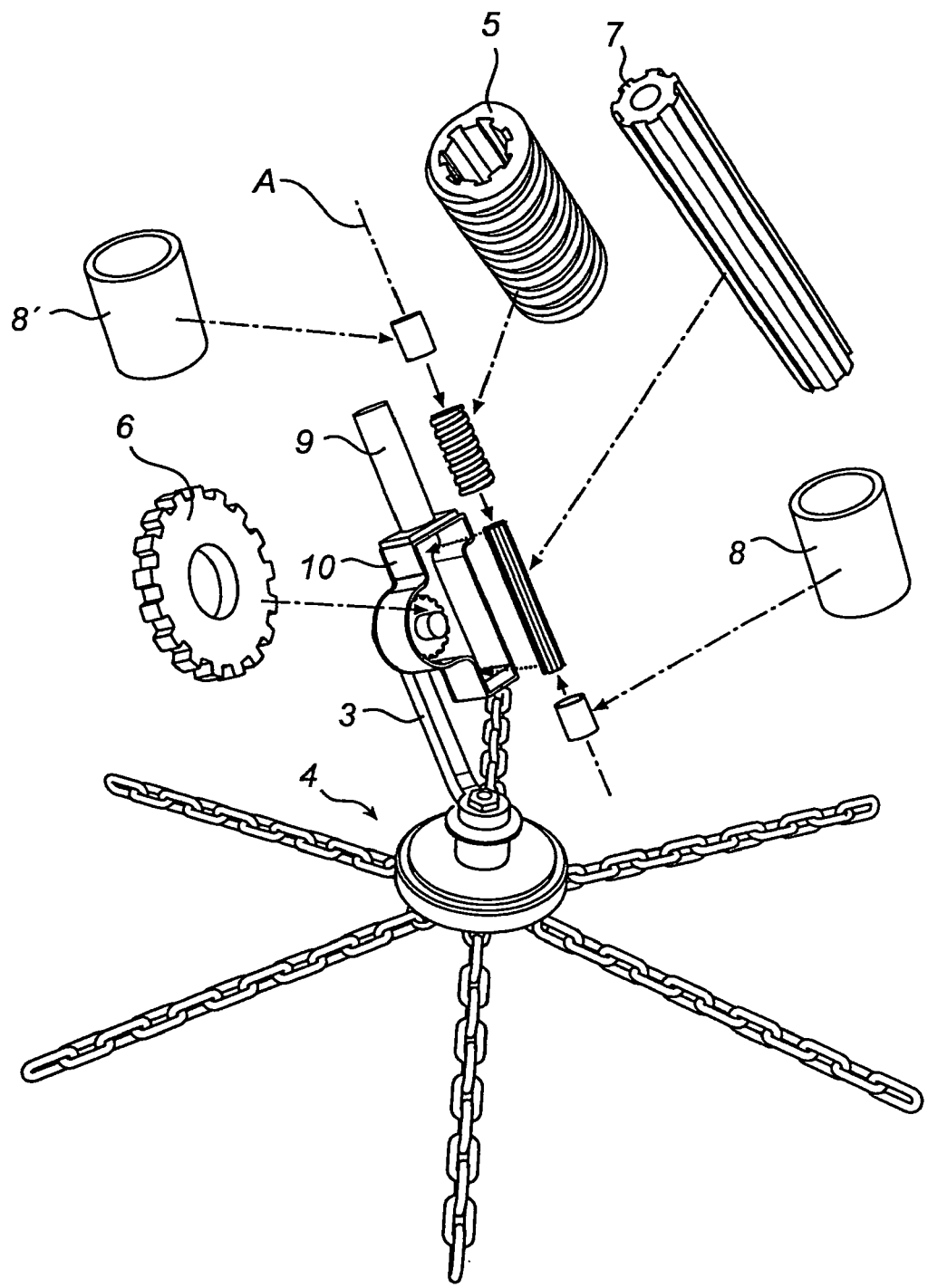
FIG. 2 is an exploded view of an operating device for an anti-skid arrangement.
Figure 3A:
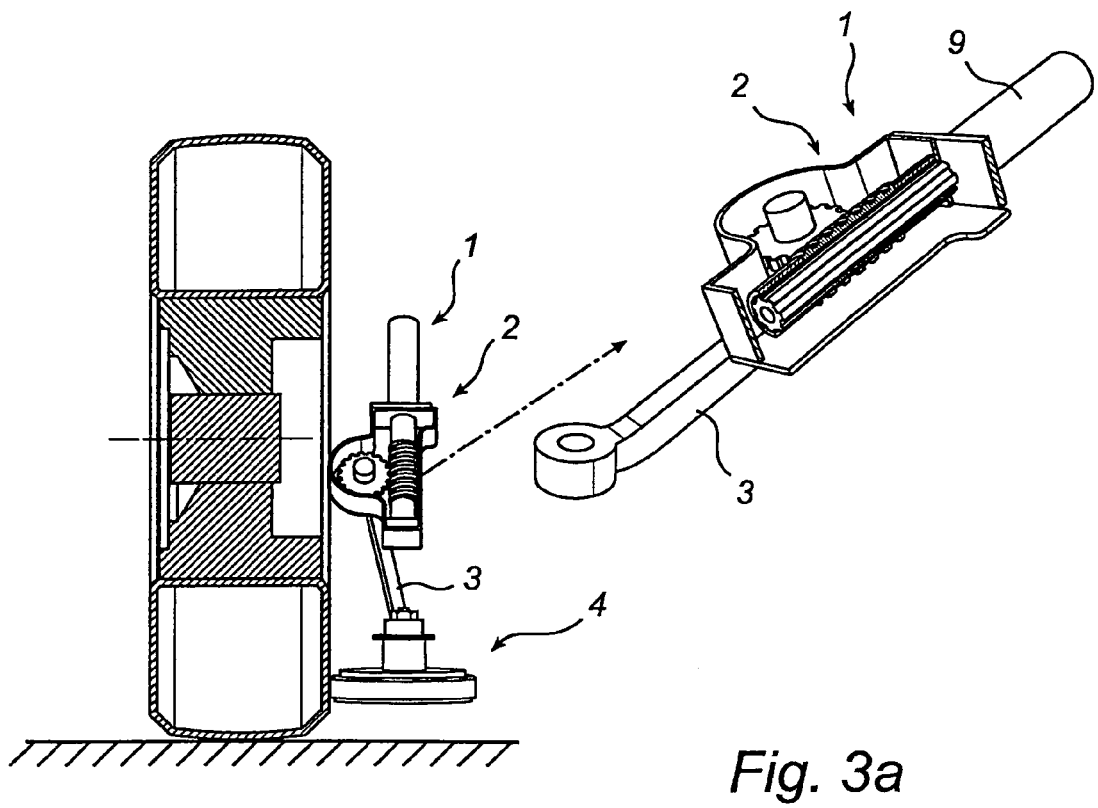
FIG. 3a is a view of an anti-skid arrangement in an activated position (chains not shown).
Figure 3B:
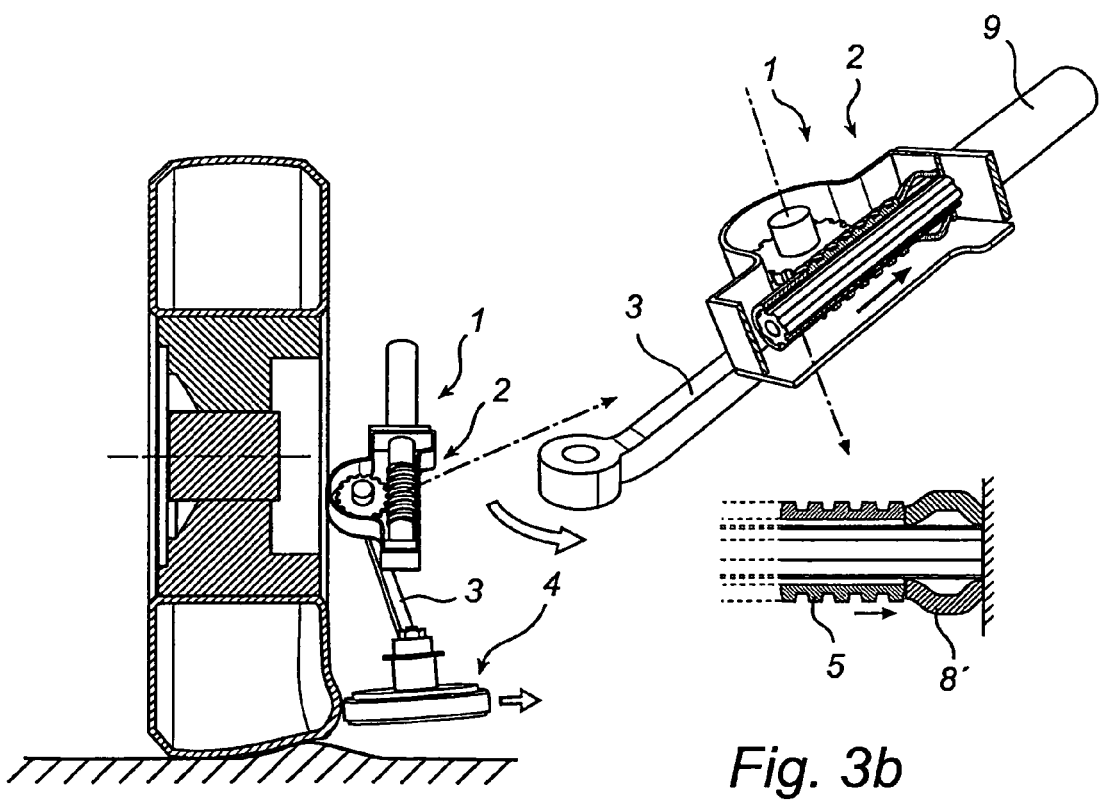
FIG. 3b is a view of an anti-skid arrangement in an activated position affect by an external impact.

The operating device 2 here comprises a worm transmission, driven by an electric motor 9, for operation of the operating arm 3 of the anti-skid mechanism between passive (FIG. 1a) and active position (FIG. 1b). The electric motor 9 drives a drive shaft, here a splineshaft 7, which transfer the rotation to the worm 5 via internal splines. As shown in FIG. 2 there is a tube 8, 8' of a resilient material around the shaft 7, on each side of the worm 5, acting as resilient means. The worm 5 is engaged with the worm wheel 6 which is connected to the operating arm 3 holding the anti-skid device 4.

If the anti-skid device 4 is exposed to an impact, for example an obstacle, forcing the arm 3 rapidly in direction towards the passive position. This rapid movement will cause the worm wheel 6 to rotate and hence translate the worm 5 along the shaft 7 and one of the resilient element 8' will be compressed. In this way the external impact to the system will not damage the anti-skid arrangement since the movement is absorbed by the resilient element 8'. The resilient element 8, 8' can be any suitable kind of spring.

There are resilient elements 8, 8' on each side of the worm 5, hence the anti-skid arrangement tolerates movements from the arm 3 in both directions.

The resilient elements 8, 8' can have the same length and stiffness, but could alternatively be designed with different length and stiffness for achieving desired properties.

The resiliently displaceable worm 5 is movable for preloading of the operating arm 3 and rotary anti-skid device 4 against the tire, and further the worm 5 is moving in the same direction during an external impact. The resilient element 8 acting in the opposite direction is compressed when the arm 3 reaches its end position in the passive position. Both the resilient elements 8, 8' will prevent wear and rattling of the anti-skid mechanism since the resilient elements 8, 8' provides a flexible suspension for the movable parts.

An external impact will force the arm 3 to rotate the worm gear 5 such that the resilient element 8' is compressed and the worm 5 is translated a certain distance causing the worm wheel 6 to reach the end of the worm and hence the worm transmission will be disengaged. Since the worm transmission is self-locking due to a reversed rotation the worm 5 will not be rotated due to an external impact from the arm 3. The self-locking will further make it possible to achieve a preload of the rotary anti-skid device 4 towards the tire. In this way the anti-skid mechanism is protected and damage to the components can be avoided.

The anti-skid device 4 is driven by contact and friction against the side of the tire causing the device 4 to rotate and successively place one of the chains, attached to the device, in front of the wheel.

Further the resilient element 8, 8' is tube-shaped and made of an elastomer material, the resilient element 8, 8' can be formed in any suitable manner to provide the worm 5 to be displaceable along the axis A.

In this manner it is possible to achieve a reliable and space-saving anti-skid mechanism.

It will be appreciated that the embodiment described above can be modified and varied by a person skilled in the art without departing from the inventive concept defined in the claims. For example the anti-skid mechanism can be designed in a different way, as long as the worm 5 is resiliently displaceable along the axis A.

The invention claimed is:

1. An operating device for a vehicle anti-skid arrangement having a rotary anti-skid device carried by an operating arm pivotally supported by the operating device, said operating device being arranged to operate said operating arm between an active position and a passive position, said operating device comprising:
    a worm gear; and
    a driven worm adapted to engage said worm gear for operation of the operating arm,
    wherein the driven worm is resiliently displaceable a distance along an axis (A) of said driven worm, and
    wherein said distance in relation to a length of said driven worm is such that when said driven worm is displaced said distance due to rotation of the worm gear caused by movement of the operating arm, said worm gear will reach the end of said driven worm and be disengaged from said driven worm.

2. The operating device according to claim 1, wherein said driven worm is resiliently displaceable in both directions from a neutral position along said axis (A).

3. The operating device according to claim 1, wherein the length of said driven worm provides a preloading of the operating arm without causing disengagement of said worm gear from said driven worm.

4. The operating device according to claim 1, wherein said driven worm is axially supported by a resilient device allowing the driven worm to be resiliently displaceable along an axis (A).

5. The operating device according to claim 4, wherein said driven worm is arranged rotationally fixed and axially displaceable along a driving shaft and wherein said resilient device is arranged around the shaft.

6. The operating device according to claim 4, wherein said resilient device is formed as a tube of a homogeneous resilient material.

7. The operating device according to claim 1, wherein said driven worm is arranged rotationally fixed and axially displaceable along a driving shaft.

8. The operating device according to claim 1, wherein said driven worm or said driving shaft is driven by an electrical motor.

9. The operating device according to claim 1, wherein said driven worm and said driving shaft are driven by an electrical motor.

* * * * *